United States Patent
Maenicke

[15] 3,644,788
[45] Feb. 22, 1972

[54] REMOTE PROTECTION APPARATUS HAVING A POLYGONAL TRIPPING REGION

[72] Inventor: Eckart Maenicke, Berlin, Germany

[73] Assignee: Siemens Aktiengesellschaft, Berlin and Munich, Germany

[22] Filed: Sept. 11, 1970

[21] Appl. No.: 71,589

[30] Foreign Application Priority Data

Sept. 12, 1969 Germany...................P 19 47 037.2

[52] U.S. Cl..........................317/27 R, 317/36 D, 317/49
[51] Int. Cl.........................................................H02h 3/26
[58] Field of Search................................317/36 D, 27 R, 49

[56] References Cited

UNITED STATES PATENTS 3,369,156  2/1968  Souillard..........................317/36 D
3,475,655  10/1969  Suzuki...............................317/36 D X
3,543,092  11/1970  Hoel..................................317/36 D X Primary Examiner—James D. Trammell
Attorney—Curt M. Avery, Arthur E. Wilfond, Herbert L. Lerner and Daniel J. Tick

[57] ABSTRACT

A remote protection apparatus has a polygonal tripping region for fault monitoring a measuring voltage and a measuring current proportional to the voltage and current of a high-voltage line. Reference impedances provide respective auxiliary sequential voltages and a difference voltage forming circuit arrangement is connected to the measuring voltage and the reference impedances for providing difference voltages corresponding to the respective differences of the auxiliary voltages and the measuring voltage. The logic circuit is connected to the auxiliary voltages and the difference voltages and furnishes a tripping signal within a period of time, when, in a given time interval, the difference voltages have zero passages and a given sign, the time interval being equal to the time difference between respective zero passages of the auxiliary voltages.

16 Claims, 10 Drawing Figures

REMOTE PROTECTION APPARATUS HAVING A POLYGONAL TRIPPING REGION

My invention relates to remote protection apparatus with a polygonal tripping range. In such apparatus, the phase sequence of auxiliary voltages appearing across comparison resistors are monitored. Also monitored is the measuring voltage for indicating a fault on the high voltage line, this measuring voltage corresponding to the instant impedance of the monitored high voltage line.

With a known remote protection apparatus of this type, three auxiliary voltages are generated for establishing the four-corned tripping range (parallelogram). Two of these auxiliary voltages establish the position of the tripping range and the third auxiliary voltage establishes the magnitude of the tripping range. With reference to the phase sequence, the following voltages are monitored: first, the two auxiliary voltages defining the position of the tripping range; second, a measuring voltage corresponding to the instant impedance of a high voltage line to be monitored; and third, a voltage for indicating a fault, this voltage arising as a difference voltage from the third auxiliary voltage and the measuring voltage.

It is an object of my invention to provide a remote protection apparatus wherein the tripping region is defined with fewer auxiliary voltages than heretofore. Subsidiary to this object it is an object of my invention to provide a remote protection apparatus having a simplified circuit configuration.

According to the invention, a remote protection apparatus having a polygonal tripping region for monitoring a measuring voltage and a measuring current proportional to the voltage and current of a high-current voltage line includes reference impedances for providing respective auxiliary phase sequential voltages. A difference voltage forming circuit arrangement is connected to the measuring voltage and the reference impedances respectively for providing difference voltages corresponding to the respective differences of the auxiliary voltages and the measuring voltage. A logic circuit connected to the auxiliary voltages and the difference voltages furnishes a tripping signal within a period of time provided that in a given time interval the difference voltages have zero passages of a given sign. The time interval is equal to the time difference between the respective zero passages of the auxiliary voltages.

It is also an object of my invention to provide a remote protection apparatus that functions independently of the phase sequence of the voltages applied to its switching circuits. It is another object of my invention to provide a remote protection apparatus that furnishes a tripping signal in response to all impedance values of the monitored high voltage line irrespective of whether the faults are arrested with a light arc or without. Subsidiary to this object, it is an object of my invention to provide such apparatus which will also detect a fault occurring at the installation location of the apparatus.

Remote Protection apparatus according to the invention distinguishes from the above-described known remote protection apparatus for a number of reasons among which include the fact that only two auxiliary voltages are required to form a four-corned tripping region. Aside from the fact that this affords a simplification of the circuit configuration of the invention apparatus as opposed to the known protection apparatus, the instant invention affords the very substantial advantage that two difference voltages are generated by using the two auxiliary voltages determining the tripping region in its totality together with the measuring voltages; these difference voltages are monitored by a logic circuit with reference to their zero passages to ascertain, whether, in a given time interval, the zero passages of the difference voltages exhibit a specific polarity, the time interval being defined by the zero passages of the auxiliary voltages.

Different from the known remote protection apparatus wherein a definite phase sequence of all of the voltages is material, the tripping criteria in the instant invention is based upon whether, in a time interval determined by the zero passages of the two auxiliary voltages, the two difference voltages have zero passages of a specific polarity or sign. Therefore, according to the remote protection apparatus of the invention, the phase sequence of the two difference voltages is unimportant, since to obtain a tripping signal, the difference voltages must only be examined as to whether or not they have like zero passages with definite polarities in a time interval defined by the zero passages of the auxiliary voltages.

In the remote protection apparatus according to the invention, it has been shown advantageous to dimension the logic circuits such that a tripping or release signal is provided when the following conditions obtain: the phase angle of a first auxiliary voltage is smaller than the phase angle of a first difference voltage; the phase angle of the first difference voltage is smaller than the phase angle of a third auxiliary voltage, the latter being shifted in phase 180° from the first auxiliary voltage; the phase angle of the first auxiliary voltage is smaller than the phase angle of a third difference voltage, the latter being shifted in the phase 180° from a second difference voltage; and, the phase angle of the third difference voltage is smaller than the phase angle of the third auxiliary voltage.

With the remote protection apparatus having this type of switching circuitry, there is a measuring time between zero and approximate 16 ms. required for delivering a tripping signal according to the phase position at fault initiation. Accordingly, by working in the just described manner, the instant invention affords the advantage that for all impedance values of the monitored high voltage line, the faults on the line being such that they are arrested with or without a light arc, a tripping signal even occurs when the short circuit is at the location of the apparatus. Also by switching-in can short circuits be detected. Accordingly, for obtaining a tripping signal, it is advantageous that no voltage supply is needed and also no voltage unrelated to the short circuit need be provided.

Should the remote protection apparatus equipped with a logic circuit be inadequate for a particular application with respect to the above boundries of measuring time of approximately 16 ms., an additional difference voltage forming circuit arrangement can be provided and connected to the measuring voltage and the reference impedances respectively for forming a further difference voltage from the sum of the two auxiliary voltages and the measuring voltage. An additional logic circuit is connected to the auxiliary voltages, the further difference voltage and the measuring voltage for furnishing a tripping signal within a period of time less than the period of time mentioned in connection with the logic circuit already referred to. In this manner it is possible to obtain a tripping time of 10 ms. or less.

The second logic circuit is advantageously constructed so as to be identical at the above-described other logic circuit, this being in reference to obtaining the smallest expense with regard to development as well as with the assembly and distribution of the apparatus.

Because the second logic circuit cannot operate accurately with measuring voltages that become ever smaller and which are applied thereto or, more particularly, with a short circuit occurring in a region or vicinity of the installation location of the remote protection apparatus, it is advantageous to detect close faults or faults in near localities by providing the second logic circuit with a comparison voltage in lieu of the measuring voltage, whereby the comparison voltage is formed preferably from the measuring voltage and an additional voltage, the latter being shifted in phase with respect to the other auxiliary voltage by 180°. In this manner, also with a measuring voltage having a null value, the comparative voltage dependent on this measuring voltage provides usable values from the additional logic circuit, so that the latter can also provide a signal in the event a fault occurs. The providing of a tripping signal by means of this additional logic circuit results preferably when the following conditions obtain: the phase angle of the second auxiliary voltage is smaller than that of the measuring voltage; the phase angle of the measuring voltage is less than that of the first auxiliary voltage; the phase angle of the second auxiliary voltage is less than the phase angle of the further difference voltage; and, the phase angle of the further difference voltage is less than the phase angle of the first auxiliary voltage.

To obtain a tripping region suitable to the practical conditions of a high voltage network, it is advantageous if the first auxiliary voltage has an inductive phase angle of approximately 80° and the second auxiliary voltage has a capacitive phase angle of approximately 10°.

Two logic circuits of the remote control apparatus according to the invention can be connected with a tripping circuit in different ways. For example, such connection can be via an OR-gate so that the tripping occurs if one of the two logic circuits delivers a tripping signal. In this case, there is provided a remote protection apparatus with which the tripping occurs with accuracy in at least 10 milliseconds. Should the tripping circuit be connected to the logic circuit via an AND-gate, then the tripping action occurs only then when both logic circuits deliver a tripping signal. One such type of arrangement has the advantage of providing great accuracy against faults resulting from transients.

With regard to the switching technology, another feature of the instant invention has shown to provide a transformer with a current proportional to the current in the monitored high voltage line; the transformer having the largest possible phase displacement angle, the transformer being constructed using air gap coil means. On the secondary side of the transformer an ohmic resistor is provided to obtain the first auxiliary voltage.

According to a further feature of the invention, to generate the second auxiliary voltage and the third auxiliary voltage, the current proportional to the current in the monitored high voltage line is also supplied to a current transformer. At the secondary side of this transformer, there are provided at least two loads, each consisting of a condenser and a resistor connected in parallel.

For obtaining the measuring voltage and forming the difference voltage using the measuring voltage, it is advantageous, if a voltage proportional to the voltage on the monitored high voltage line be connected or applied to an additional transformer having the smallest possible displacement angle, the transformer having three secondary windings when used with two logic circuits. Therewith it has been shown practical for detecting near faults or faults at near localities, when a circuit arrangement provides an auxiliary transformer having primary and secondary sides. The primary side is connected to the measuring current proportional to the measuring current of the high voltage line and the secondary is connected to the primary winding of the additional transformer so as to provide an ancillary voltage in series with the measuring voltage, the ancillary voltage being shifted 180° in phase with respect to the supplementary voltage.

According to still another feature of the invention, the remote protection apparatus is provided with an additional auxiliary transformer connected to the measuring current and having secondary winding means for providing an ancillary auxiliary voltage corresponding in phase and magnitude to the second auxiliary voltage. The additional difference voltage forming means includes a serial connection of the resistor connected to the secondary of the first transformer, the secondary winding of the additional transformer and the secondary winding means. The serial connection is connected to the second logic circuit for applying the further difference voltage thereto. The transformer means includes the primary winding and another one of the secondary winding of the additional transformer, the latter being connected to the second logic circuit so as to apply a further comparison voltage thereto. The further comparison voltage is shifted in phase 180° with respect to the first-mentioned comparison voltage. The resistor connected to the secondary of the first transformer is connected to the second logic circuit for applying the first auxiliary voltage thereto. The second impedance connected to the second side of the current transformer is connected to the second logic circuit for applying the second auxiliary voltage thereto.

A special advantage of the instant invention is that it affords the possibility of providing tripping regions having more than four corners. According to a further feature of my invention, such tripping regions having $n$ corners are obtained where $n$ is an even number greater than four by providing reference impedances for providing $n/2$ auxiliary voltages. A difference voltage forming means for forming at least $n/2$ difference voltages from the auxiliary voltages and the measuring voltage is needed as well as at least $n/2$ logic circuits, each of the logic circuits being connected to selected ones of the auxiliary voltages and the difference voltages. Where a tripping region having an odd number of corners in excess of four is required, the quantity $(n+1)/2$ is substituted for $n/2$. By means of a corresponding number of auxiliary voltages and the difference voltages formed from these auxiliary voltages together with the measuring voltages, it is possible to form any desired tripping region for a remote protection apparatus.

The invention will now be described with reference to the drawings wherein:

FIGS. 1a and 1b show pertinent voltages in vector representation and as a function of time respectively for illustrating the operation of a protection apparatus according to the invention.

FIGS. 2a and 2b also illustrate the operation of the invention and are similar in their presentation to FIGS. 1a and 1b respectively.

Figure 1A:
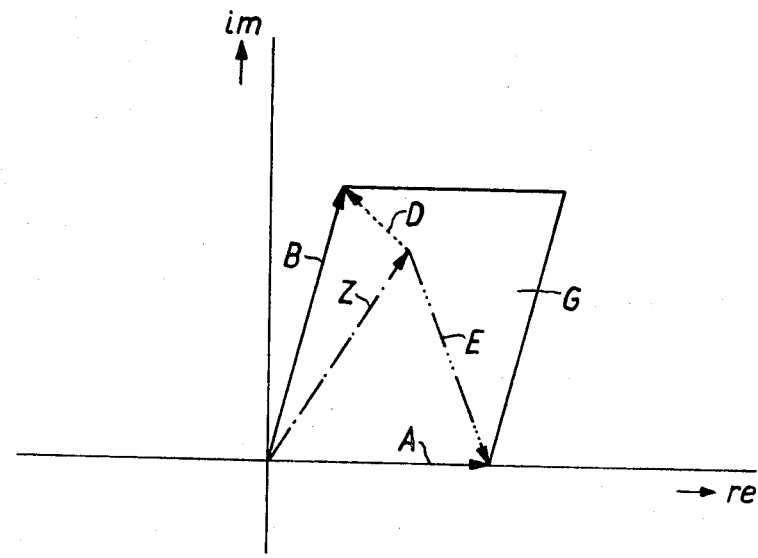
Figure 1B:
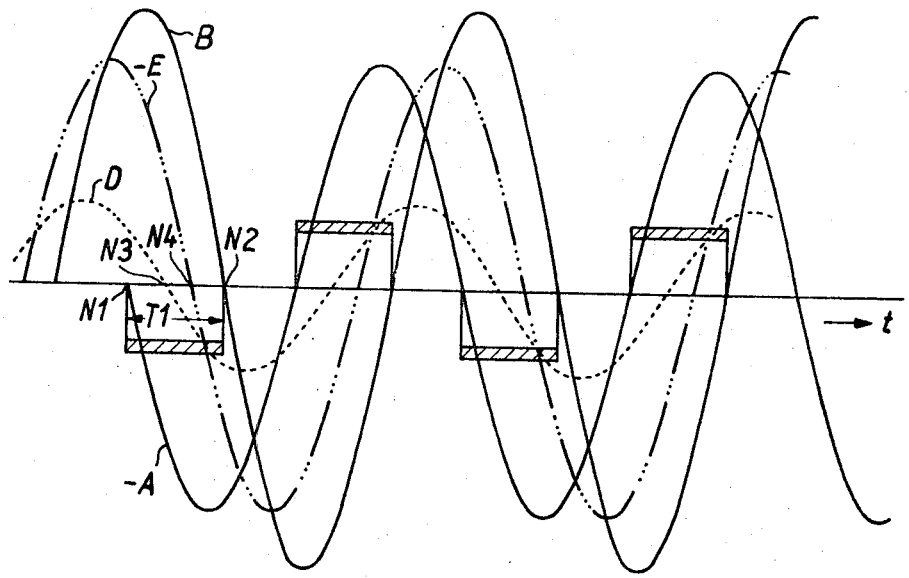

Referring to FIGS. 1a and 1b, FIG. 1a illustrates a vector diagram wherein real parts are plotted on the abscissa and imaginary parts are plotted on the ordinate. The vector diagram shows a parallelogram defining the tripping region G formed by a first auxiliary voltage B and a second auxiliary voltage A, both voltages having their origin at the origin of the coordinate system. Assuming that a fault occurs with a measuring voltage designated by the arrow Z, which according to the illustration in FIG. 1a has its end falling within the tripping region G, then difference voltages D and E are formed from the auxiliary voltages A and B with consideration being taken of the measuring voltage Z, where the difference voltage D is illustrated as the difference of the first auxiliary voltage B and the measuring voltage Z and the additional difference voltage E is illustrated as the difference of the second auxiliary voltage A and the measuring voltage Z.

An analysis of FIG. 1a also shows that for each occurring fault that is characterized by means of a measuring voltage Z lying within the tripping region G it is always required that the following condition be met:

$$\underline{B} \leq \underline{D} \leq \underline{-A} \text{ and } \underline{B} \leq \underline{-E} \leq \underline{-A}$$

At every failure occuring within the tripping range G, the following obtains: The phase angle of the first auxiliary voltage B is smaller than the phase angle of the one difference voltage D, and the phase angle of the difference voltage D is smaller than the third auxiliary voltage $-A$, the latter being 180° phase displaced from voltage A, as well as when the phase angle of the first auxiliary voltage B is smaller than the third difference voltage $-E$, the latter being phase displaced 180° from the other difference voltage E, and the phase angle of the third difference voltage $-E$ is on the one hand again smaller than the third auxiliary voltage $-A$.

If the individual voltages shown in FIG. 1a in the form of a vector diagram are illustrated as a function of time as shown in FIG. 1b, it is then recognized that a fault in the tripping range G is characterized in that in a time interval T1 defined by the zero passage N1 of the additional auxiliary voltage −A and by another zero passage N2 of the first auxiliary voltage B, the difference voltages D and −E exhibit the same zero passages N3 and N4 with a definite sign. If this condition is present, a fault on the monitored high voltage line lies in the tripping range G.

Figure 3:
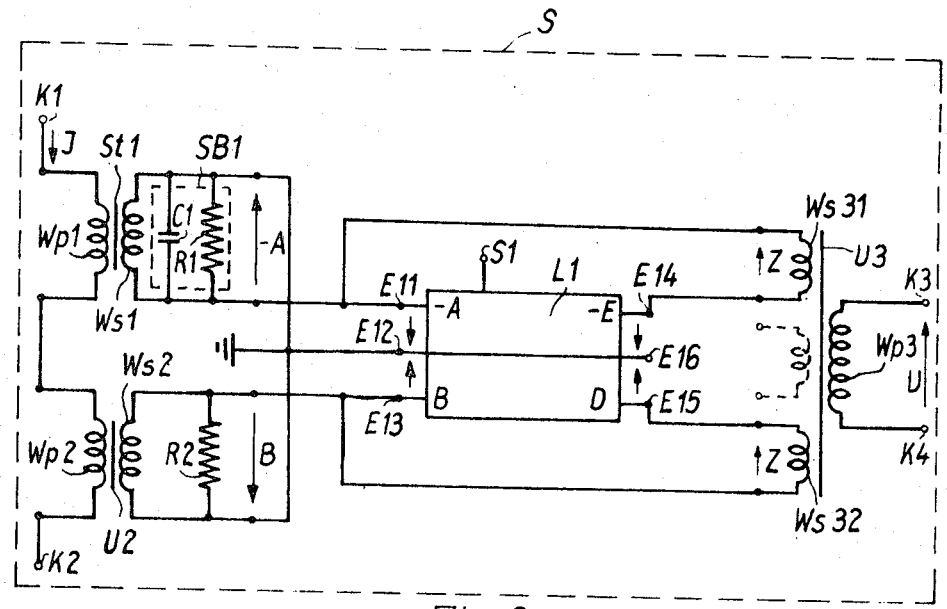
FIG. 3 is a circuit schematic of an embodiment of a remote protection apparatus according to the invention equipped with a logic circuit.

Switching technology permits this condition to be resolved by means of the switching arrangement as illustrated in FIG. 3. A current J is directed to the switching arrangement S via terminals K1 and K2, the current being proportional to the current in the monitored high voltage line. A voltage is applied to terminals K3 and K4 which is proportional to the instant voltage in the monitored high voltage line.

The current J flows through a primary winding Wp1 of a current transformer St1. A load SB1 is connected to the secondary winding Ws1 of the current transformer. The load SB1 comprises a parallel connection of a condenser C1 and resistance R1, so that a voltage −A occurs across the load SB1 capacitively displaced with respect to the current J in the primary circuit. Voltage −A constitutes the third auxiliary voltage.

The third auxiliary voltage −A is supplied to the input terminals E11 and E12 of a logic circuit L1. The logic circuit L1 is also connected to the auxiliary voltage B via input terminals E11 and E12. The auxiliary voltage B appears across an ohmic resistance R2. The ohmic resistance R2 is connected to a secondary winding Ws2 of a transformer U2 having the largest possible phase displacement angle and comprising airgap core means. The primary winding Wp2 of this transformer U2 is in serial connection with the primary winding Wp1 of the current transformer St1, and consequently, the current J likewise flows through winding Wp2. The auxiliary voltage B accordingly exhibits an inductive phase angle amounting to approximately 80°.

For obtaining the additional difference voltage −E there is provided an additional transformer U3 having a secondary winding Ws31 connected with input terminals E14 and E11 of the logic circuit L1. Transformer U3 has a primary winding Wp3 connected to voltage U. An additional secondary winding Ws32 of the transformer U3 is connected with other input terminals E15 and E13 of the logic circuit L1, whereby a difference voltage D and the additional difference voltage −E are formed at the input terminals E15, E16 and input terminals E14, E16 respectively.

The voltages −A, B, −E and D are applied to the logic circuit L1 whereat these voltages are monitored for their respective zero passages. With these voltages the logic current L1 functions to deliver a release or tripping signal at the output terminal S1 when the same kind of zero passages of the difference voltages −E and D occur within the time interval T1. In this connection reference may be made to FIG. 1b wherein voltages D and −E both pass through zero with negative slope in the time interval T1.

Figure 2A:
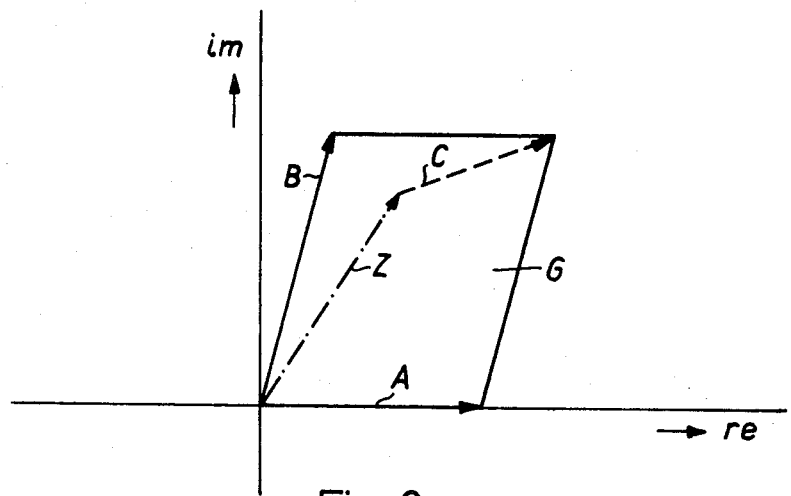

To shorten the measuring time of the distance protection apparatus according to the invention as well as raising the accuracy of measurement, it is advantageous if a second triggering condition be included for obtaining tripping action. To achieve this condition, it is preferable to form a further difference voltage C as illustrated in FIG. 2a. In the vector diagram of FIG. 2a, the tripping region G is again bounded by the two auxiliary voltages A and B. And in the illustrated case, a fault is assumed in the tripping range G, the fault being characterized by the measuring voltage Z. The further difference voltage C results from the difference of the sum of the two auxiliary voltages A and B and the measuring voltage Z. It is then recognized that a fault in the tripping range always occurs if $$\lfloor A \leq \lfloor Z \leq \lfloor B \text{ and } \lfloor A \leq \lfloor C \leq \lfloor B$$

This means that a fault in tripping region G occurs when the phase angle of the second auxiliary voltage A is smaller than the phase angle of the measuring voltage Z, and the phase angle of the measuring voltage Z is again smaller than the phase angle of the first auxiliary voltage B, and additionally, the phase angle of the second auxiliary voltage A is smaller than the phase angle of the further difference voltage C, and the phase angle of the further difference voltage C is smaller than the phase angle of the first auxiliary voltage B.

Figure 2B:
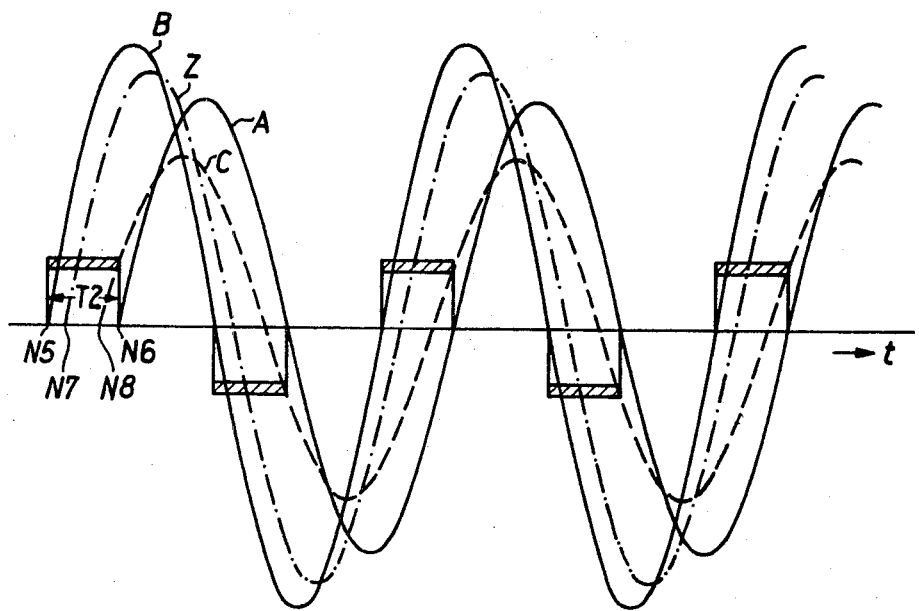

The time displacement given in FIG. 2b of the voltages illustrated by vector diagram in FIG. 2a shows that a tripping condition occurs if, in the time interval T2, the measuring voltage Z and the further difference voltage C exhibit similar zero passages N7 and N8 of predetermined sign. The time interval T2 is defined by the zero passages N5 and N6 of the auxiliary voltages B and A respectively.

Figure 4:
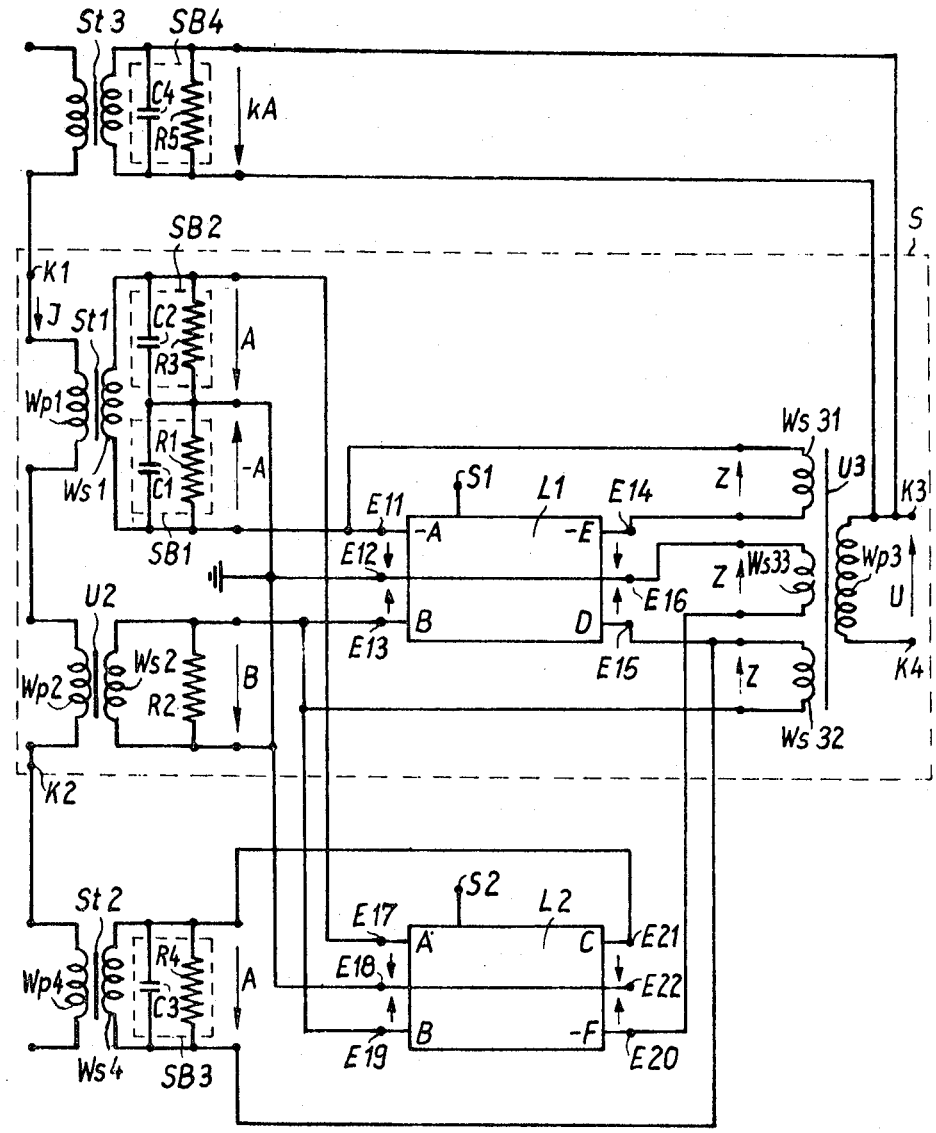
FIG. 4 is a circuit schematic of an embodiment of a remote protection apparatus according to the invention equipped with two logic circuits.

The switching technology permits the foregoing conditions together with the above-mentioned other tripping conditions to be evaluated with, for example, a switching arrangement as illustrated in FIG. 4. When compared to the switching arrangement according to FIG. 3, the arrangement of FIG. 4 provides an additional logic circuit L2 and an additional current transformer St2. For detecting near faults or faults at near localities, there is provided still a third current transformer St3 having a secondary circuit in series with the primary winding Wp3 of the additional transformer U3. Those portions of FIG. 4 which correspond to FIG. 3 are designated with the same reference numerals.

Before continuing the description of the remote protection apparatus shown in FIGS. 3 and 4, it will be helpful to take into account that the logic circuits L1 and L2 comprise commercially available units or modules obtainable from various manufacturers, for example, the manufacturer designated herein below.

A comparison of FIGS. 3 and 4 shows that the circuitry according to FIG. 4, among other factors, is changed insofar that the current transformer St1, except for the load SB1, has an additional load SB2 like the load SB1. Load SB1 made up of a condenser C2 and a resistor R3. Load SB2 accordingly develops an auxiliary voltage A with a capacitive phase angle in the order of magnitude of about 10°. The auxiliary voltage A is applied to the logic circuit L2 across input terminals E17 and E18. The input terminals E18 and E19 are connected with the auxiliary voltage B. An additional input terminal E20 of the additional logic circuit L2 is connected with an end of the third secondary winding Ws33 of the additional transformer U3. The other end of winding Ws33 is connected with the input terminal E16 of the logic circuit L1. In addition, the input E13 of the logic circuit L1 is connected directly with the input terminal E19 of the additional logic circuit L2. Accordingly, auxiliary voltages A and B appear across input terminals E17, E18 and E19, E18 respectively.

In additional current transformer St2 is provided for directing the additional difference voltage C to the input E21–E22 of the additional logic circuit L2. The primary winding Wp4 is in serial connection with the primary windings Wp1 and Wp2 of the current transformer St1 and of the transformer U2 respectively. Accordingly, the current J flows also through the primary winding Wp4. A load SB3 is connected to the secondary winding Ws4 of the current transformer St2, the load SB3 comprising a parallel connection of a condenser C3 and of a resistor R4. This load delivers an auxiliary voltage which, since it is identical with auxiliary voltage A of the transformer St1, is in FIG. 4 likewise designated with reference character A. This voltage A is on the one hand at the input terminal E21 of the additional logic circuit L2 and, on the other hand, on the end of the secondary winding Ws32 of the additional transformer U3.

Because of the required switching steps, the auxiliary voltage A and B as well as the further difference voltage C and a voltage −F are applied to the logic circuit L2, the voltage −F being obtained from a comparison voltage F by means of a displacement of 180°. Comparison voltage F is formed with consideration of an additional voltage k·A which lies in series with the voltage U at the primary winding Wp3 of the additional transformer U3. In this connection, the additional voltage k·A is obtained by means of an additional current transformer St3 through which flows the current J. The secondary side of transformer St3 is loaded with a load SB4 that consists of a parallel connection of a condenser C4 and resistor R5, so that the additional voltage K·A exhibits a capacitive phase angle that, preferably, is the same as the angle of the other auxiliary voltage A.

Figure 5:
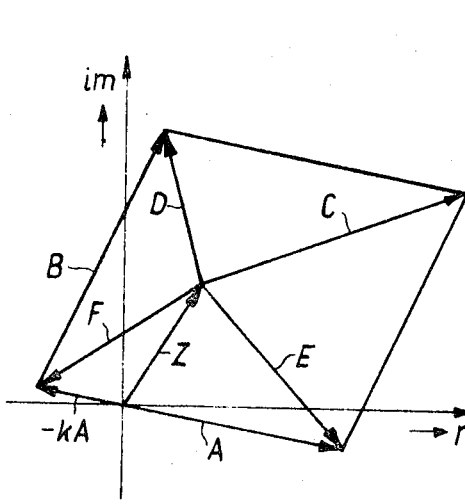
FIG. 5 illustrates a vector diagram illustrating the operation of the circuit according to FIG. 4.

In FIG. 5 is illustrated what function the additional voltage k·A or the voltage—k·A performs, the latter being displaced 180° with reference to the voltage k·A. From FIG. 5 it is recognized that, by introducing this additional voltage k·A, it is also possible to detect faults that lie in the immediate region of the origin of the coordinate system; that is, the detection of faults is made possible when the measuring voltage Z is at null. In this case, there remains for evaluation a voltage F that, in this instance, is identical with the additional voltage —k·A.

This has the significance that the remote protection apparatus according to the invention whose circuit arrangement and whose mode of operation are illustrated in FIGS. 4 and 5 respectively not only affords the advantage of shorter tripping time with such high safety against false tripping, but also affords the advantage that near faults or faults at near localities are detected without difficulty and lead to tripping, so that it is possible to do it without voltage supplies and voltages not related to short circuits.

Figure 6:
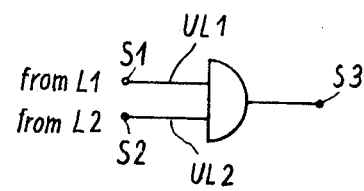
FIG. 6 illustrates schematically an AND-gate having inputs connectable respectively to the logic circuits of FIG. 4.

The output terminal S2 of the logic circuit L2 delivers a tripping signal in the same manner as the logic circuit L1. Referring now to FIG. 6, the illustrated AND-gate has two inputs UL1 and UL2 which connect with the output terminals S1 of logic circuit L1 and S2 of logic circuit L2, respectively. The output terminal S3 of the AND-gate provides a tripping signal only when both inputs UL1, UL2 from the respective logic circuits L1 and L2 provide tripping signals. This type of circuit arrangement offers a comparatively large measure of safety against false trippings resulting from transients, this safety being approximately double than that afforded by the embodiment according to FIG. 3.

Figure 7:
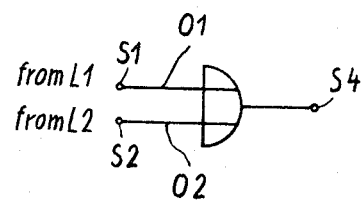
FIG. 7 illustrates schematically an OR-gate having inputs connectable respectively to the logic circuits of FIG. 4.

FIG. 7 illustrates an OR-gate having inputs O1 and O2 connectable to the output terminals S1 of the logic circuit L1 and S2 of the logic circuit L2 respectively. The output terminals S4 of the OR-gate provides a tripping signal when either one of the two inputs O1 or O2 from the logic circuits L1 and L2 provide a tripping signal. With this OR-gate there is obtained a switching action in the smallest possible tripping time, approximately half of the time provided by the embodiment of the remote protection apparatus according to FIG. 3.

Figure 8:
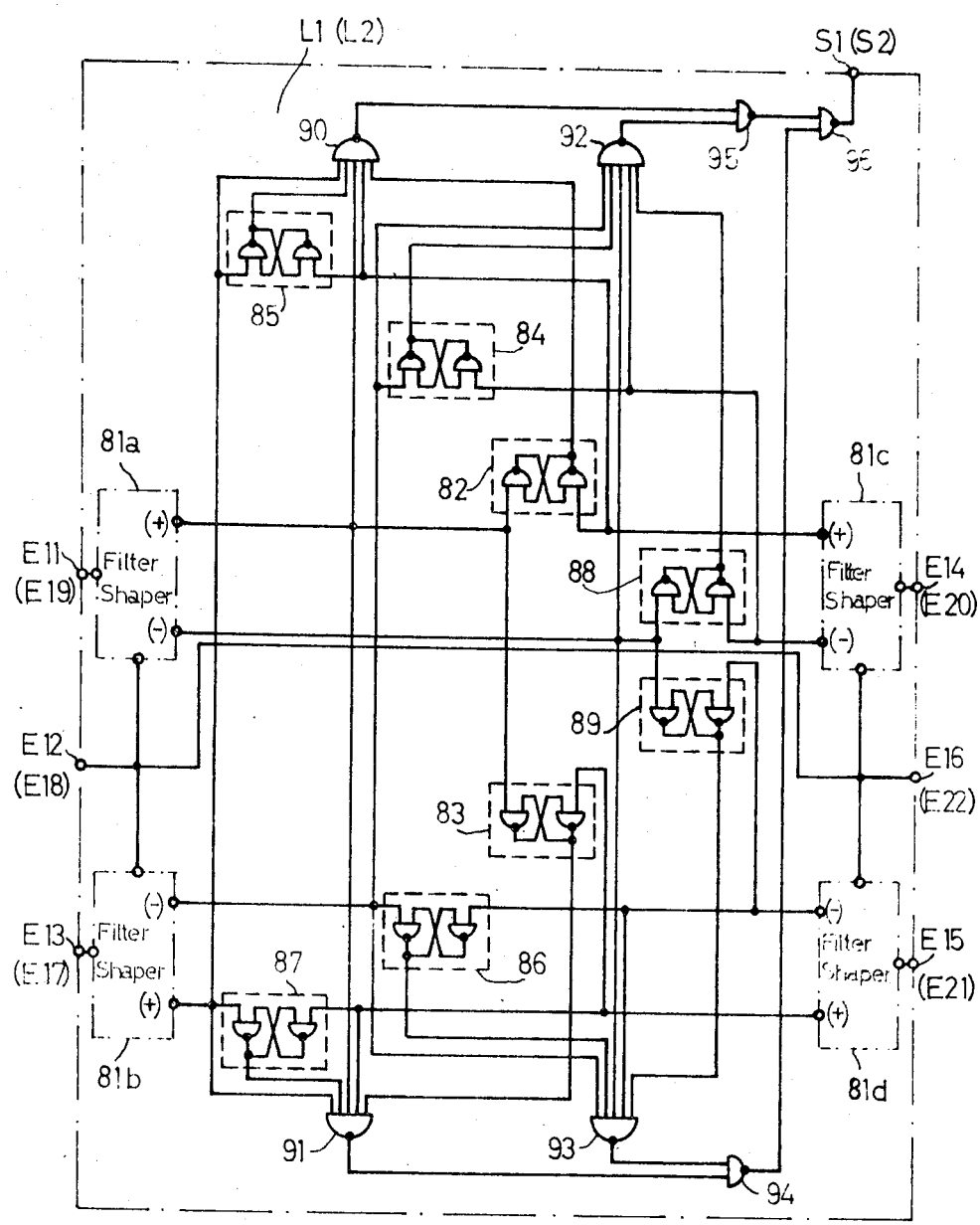
FIG. 8 is a detailed circuit schematic of the logic circuit to be used for logic circuit L1 of FIG. 3 and each of the logic circuits L1 and L2 of FIG. 4.

FIG. 8 illustrates the circuit arrangement for each of the logic circuits L1 and L2. The reference designations enclosed in parenthesis apply to logic circuit L2. Since logic circuits L1 and L2 are the same they both have the same mode of operation.

A filter 81a having a shaper circuit in cascade therewith is connected to the input terminal E11. The filter 81a is preferably of the band-pass type. Input terminals E13, E14 and E15 supply similar filter circuits 81b, 81c and 81d. The input terminals E12 and E16 are connected to each other as well as to each of the filters 81a, 81b, 81c and 81d.

The logic circuit L1 contains in addition several flip flop circuits 82, 83, 84, 85, 86, 87, 88 and 89, each of which comprises two NAND-gates; these gates are connected with each other in a suitable manner and with the filters 81a, 81b, 81c and 81d as well as the NAND-gates 90, 91, 92 and 93, each of the NAND-gates having five inputs. The outputs of the NAND-gates 90 to 93 connect to the output terminal S1 of the logic circuit L1 via NAND-gates 94, 95, 96.

The output terminal of the filter 81a designated (+) is connected with the inputs of the flip-flop circuits 82,83 on the one hand and is connected to the inputs of the NAND-gates 90,91 on the other hand. The output terminal (—) of filter 81a is connected with the inputs of the flip-flop circuits 88,89 and with the inputs of NAND-gates 92,93.

The output terminal (+) of filter 81c is connected with the inputs of the flip-flop circuits 82 and 85 as well as with an input of the NAND-gate 90. The output terminal (—) of the filter 81c supplies the flip-flop circuits 88 and 84 and the NAND-gate 92.

The output terminal (—) of filter 81b supplies the flip-flop circuits 84,86 and the NAND-gates 92,93. The output terminal (+) of the filter 81b supplies the flip-flop circuits 85,87 and the NAND-gates 90,91.

The output gates (—) of the filter 81d supplies the flip-flop circuits 86,89 and the NAND-gate 93. The output terminals (+) of the filter 81d is connected with the inputs of the flip-flop circuits 83,87 and one input of NAND-gate 91.

The outputs of flip-flop circuits 85,82 are connected to NAND-gate 90 and the outputs of the flip-flop circuits 84,88 are connected to the NAND-gate 92. In addition the outputs of the flip-flop circuits 83,87 are connected to the NAND-gate 91 and the outputs of the flip-flop circuits 86,89 are connected to the NAND-gate 93.

By supplying the inputs E11 to E15 with the above-mentioned voltages the output terminal S1 will supply a tripping signal when the tripping conditions are fulfilled.

As mentioned, the logic circuits of FIGS. 3 and 4 comprise components that are commercially available. The logic circuits preferably consist exclusively of solid state circuit devices. Among the various commercial sources of suitable devices is applicant's assignee, Siemens AG, a corporation of Germany located at Berlin and Munich, Germany and elsewhere. Components are available from this corporation or from Siemens America Inc. at Islin, New Jersey, under the trademark Simatic, and are described by various literature issued by the corporation including pricelists S131, first and second portion. It will be understood, however, that corresponding components of other manufacturers may likewise be used and that details of the circuitry may be modified in various respects without departing from the essential features of the present invention and within the scope of the claims annexed hereto.

I claim:

1. Remote protection apparatus having a polygonal tripping region for fault monitoring a measuring voltage and a measuring current proportional to the voltage and current of a high voltage line, the apparatus comprising reference impedances for providing respective auxiliary phase-sequential voltages, difference-voltage forming means connected to said measuring voltage and said reference impedances respectively for providing difference voltages corresponding to the respective differences of said auxiliary voltages and said measuring voltage, a logic circuit connected to said auxiliary voltages and said difference voltages for furnishing a tripping signal within a period of time, when, in a given time interval, said difference voltages have zero passages of a given sign, said time interval being equal to the time difference between respective zero passages of said auxiliary voltages.

2. An apparatus according to claim 1 wherein said auxiliary voltages are at least two in number, a first one of said auxiliary voltages leading a second one of said auxiliary voltages, said difference voltages being at least two in number, one of said difference voltages being the difference between said first auxiliary voltage and said measuring voltage and the other one of said difference voltages being the difference between said second auxiliary voltage and said measuring voltage, said apparatus comprising means connected to said measuring current for providing a third auxiliary voltage shifted in phase 180° from said second auxiliary voltage, said difference voltage forming means including means for forming a third difference voltage shifted in phase 180° from said other difference voltage, and said logic circuit including means for furnishing a tripping signal when: the phase angle of said first auxiliary voltage is smaller that the phase angle of said one difference voltage; the phase angle of said one difference voltage is smaller than the phase angle of said third auxiliary voltage; the phase angle of said first auxiliary voltage is smaller than the phase angle of said third difference voltage; and, the phase angle of the latter is smaller than the phase angle of said third auxiliary voltage.

3. Apparatus according to claim 1, wherein first, second, and third of said auxiliary voltages are provided by three of said reference impedances respectively, the first auxiliary voltage leading the said second auxiliary voltage, said apparatus comprising additional difference voltage forming means connected to said measuring voltage and said reference impedances respectively for forming a further difference voltage from the difference of the sum of said first and second auxiliary voltages and said measuring voltage, circuit means connected to said measuring current for forming a supplementary voltage shifted in phase 180° with respect to said second auxiliary voltage, transformer means connected to said supplementary voltage for forming a comparison voltage, and an additional logic circuit connected to said first and second auxiliary voltages, said further difference voltage and said comparison voltage for furnishing a tripping signal within a period of time less than said first mentioned period of time.

4. Apparatus according to claim 1 wherein first and second auxiliary voltages are provided by two of said reference impedances, said apparatus comprising additional difference-voltage forming means connected to said measuring voltage and said reference impedances respectively for forming a further difference voltage from the difference of the sum of said first and second auxiliary voltages and said measuring voltage, and an additional logic circuit connected to said first and second auxiliary voltages, said further difference voltage and said measuring voltage for furnishing a tripping signal within a period of time less than said first mentioned period of time.

5. Apparatus according to claim 4, wherein said first auxiliary voltage leads said second auxiliary voltage, said additional logic circuit including means for furnishing a tripping signal when: the phase angle of said second auxiliary voltage is less than the phase angle of said measuring voltage; the phase angle of said measuring voltage is less than the phase angle of said first auxiliary voltage; the phase angle of said second auxiliary voltage is less than the phase angle of said further difference voltage; and, the phase angle of said further difference voltage is less than the phase angle of said first auxiliary voltage.

6. Apparatus according to claim 1, wherein first and second auxiliary voltages are provided by two of said reference impedances respectively, said auxiliary voltages leading said second auxiliary voltages, said second auxiliary voltages having a capacitive phase angle of about 10°.

7. Apparatus according to claim 1, wherein first and second auxiliary voltages are provided by two of said reference impedance respectively, said first auxiliary voltage leading said second auxiliary voltage, said first auxiliary voltage having an inductive phase angle of about 80°.

8. Apparatus according to claim 4, comprising a tripping circuit, and an OR-gate connected to said tripping circuit, said tripping circuit being connected via said OR-gate respectively with said first-mentioned logic circuit and said additional logic circuit, whereby said tripping circuit is actuated when one of said logic circuits furnishes a tripping signal.

9. Apparatus according to claim 4, comprising a tripping circuit, and an AND-gate connected to said tripping circuit, said tripping circuit being connected via said AND-gate respectively with said first-mentioned logic circuit and said additional logic circuit, whereby said tripping circuit is actuated when both of said logic circuits furnish a tripping signal.

10. Apparatus according to claim 3 comprising a first transformer connected to said measuring current and having the largest possible phase angle, said transformer having primary and secondary sides, a first one of said reference impedances being a resistor, said secondary side being connected to said resistor for providing said first auxiliary voltage.

11. Apparatus according to claim 10, comprising a current transformer connected to said measuring current and having primary and secondary sides, second and third ones of said reference impedances each consisting of a resistor and capacitor connected in parallel, said secondary side being connected to each of said second and third reference impedances for providing respectively said second and said third auxiliary voltages, the latter being displaces 180° in phase with respect to said second auxiliary voltages.

12. Apparatus according to claim 11 comprising an additional transformer connected to said measuring voltage and having the largest possible phase angle, said additional transformer having a primary winding and at least two secondary windings, and a logic circuit respectively connected to said secondary windings.

13. Apparatus according to claim 12, said circuit means comprising an auxiliary transformer having primary and secondary sides, said primary side being connected to said measuring current, said secondary side being connected to said primary winding of said additional transformer so as to providing an ancillary voltage in series with said measuring voltage, said ancillary voltage being shifted 180° in phase with respect to said supplementary voltage.

14. Apparatus according to claim 13, comprising an additional auxiliary transformer connected to said measuring current and having secondary winding means for providing an ancillary auxiliary voltage corresponding in phase and magnitude to said second auxiliary voltage, said additional difference-voltage forming means including a serial connection of said resistor connected to the secondary of said first transformer, a secondary winding of said additional transformer and said secondary winding means, said serial connection being connected to said second logic circuit for applying said further difference voltage thereto, said transformer means including said primary winding and an other one of said secondary windings of said additional transformer, the latter being connected to said second logic circuit so as to apply a further comparison voltage thereto, said further comparison voltage being shifted in phase 180° with respect to said first mentioned comparison voltage, said resistor connected to said secondary of said first transformer being connected to said second logic circuit for applying said first auxiliary voltage thereto, and said second impedance connected to said secondary side of said current transformer being connected to said second logic circuit for applying said second auxiliary voltage thereto.

15. Apparatus according to claim 1 wherein the polygonal tripping region has an even number of corners in excess of four, $n$ being the number of corners, said apparatus comprising reference impedances for providing $n/2$ auxiliary voltages, difference-voltage forming means for forming at least $n/2$ difference voltages from said auxiliary voltages and said measuring voltage, and at least $n/2$ logic circuits, each of said circuits being connected to selected ones of said auxiliary voltages and said difference voltages.

16. Apparatus according to claim 1 wherein the polygonal tripping region has an odd number of corners in excess of four, $n$ being the number of corners, said apparatus comprising reference impedances for providing $(n+1)/2$ auxiliary voltages, difference-voltage forming means for forming at least $(n+1)A\nu 2$ difference voltages from said auxiliary voltages and said measuring voltage, and at least $(n+1)/2$ logic circuits, each of said circuits being connected to selected ones of said auxiliary voltages and said difference voltages.

* * * * *